United States Patent
Kocanaogullari et al.

(10) Patent No.: US 10,810,468 B2
(45) Date of Patent: Oct. 20, 2020

(54) SYSTEM FOR TRAINING DESCRIPTOR WITH ACTIVE SAMPLE SELECTION

(71) Applicant: Mitsubishi Electric Research Laboratories, Inc., Cambridge, MA (US)

(72) Inventors: Aziz Kocanaogullari, Boston, MA (US); Esra Cansizoglu, Boston, MA (US); Radu Ioan Corcodel, Quincy, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 79 days.

(21) Appl. No.: 16/261,807

(22) Filed: Jan. 30, 2019

(65) Prior Publication Data

US 2020/0242410 A1    Jul. 30, 2020

(51) Int. Cl.
   *G06K 9/62*        (2006.01)
   *G06T 7/73*        (2017.01)

(52) U.S. Cl.
   CPC ......... *G06K 9/6262* (2013.01); *G06K 9/6202* (2013.01); *G06K 9/6215* (2013.01); *G06K 9/6257* (2013.01); *G06T 7/73* (2017.01); *G06K 2009/6213* (2013.01); *G06T 2207/20081* (2013.01); *G06T 2207/20084* (2013.01)

(58) Field of Classification Search
   CPC .. G06K 9/6262; G06K 9/6257; G06K 9/6215; G06K 9/6202; G06K 2009/6213; G06T 7/73; G06T 2207/20084; G06T 2207/20081
See application file for complete search history.

(56) References Cited

U.S. PATENT DOCUMENTS

| | | | | |
|---|---|---|---|---|
| 10,354,170 | B2* | 7/2019 | Fu | G06K 9/6257 |
| 10,467,526 | B1* | 11/2019 | Appalaraju | G06K 9/6215 |
| 2012/0113239 | A1* | 5/2012 | Krupnik | A61B 1/0005 348/65 |
| 2016/0188725 | A1* | 6/2016 | Wang | G06F 16/9535 707/734 |
| 2019/0018861 | A1* | 1/2019 | Solem | G06F 16/5866 |
| 2019/0180418 | A1* | 6/2019 | Kuybeda | G06K 9/46 |
| 2019/0205431 | A1* | 7/2019 | Gattiker | G06F 16/9535 |
| 2019/0392201 | A1* | 12/2019 | Ostrovsky | G06K 9/00677 |

* cited by examiner

*Primary Examiner* — Ming Y Hon
(74) *Attorney, Agent, or Firm* — Gennadiy Vinokur; James McAleenan; Hironori Tsukamoto

(57) ABSTRACT

A system for active-training a neural network includes an input interface to receive a set of images, a memory to store an active sampler, a feature generator and a subset of the images selected from the set of the images, the subset of the images having similarity values based on a predetermined feature domain information, at least one processor to train the feature generator by use of the active sampler. The active sampler is configured to perform first-selecting, from the subset of the images, a pair of images as matching pair images according to a threshold of similarity values, second-selecting a pair of images from another subset of the images, feeding the matching pair images and the unmatched pair images to the feature generator, updating weighting parameters and increasing the threshold according to preset values an output interface to render the weighting parameters of the feature generator.

15 Claims, 5 Drawing Sheets

Algorithm 1 Active sampling: shows the steps of active sampling during batch training given initial viewpoint variation threshold $\delta_0$. The algorithm actively selects the by increasing the threshold at every epoch.

---

$\delta_0 \in \mathbb{R}^+$
procedure TRAINING($e \to$ num-epoch)
    for $i \to$ num-batch do
        $\mathcal{T}_e^i \leftarrow (4)$
        $(a, p, n) \leftarrow \mathcal{T}_e^i$
        $\theta \leftarrow \theta - \gamma \nabla_\theta \mathcal{L}_m(a, p, n, m)$
    $\delta_{e+1} \leftarrow \delta_e + \Delta$
return $\theta$

FIG. 3

SYSTEM FOR TRAINING DESCRIPTOR WITH ACTIVE SAMPLE SELECTION

FIELD OF THE INVENTION

This invention generally relates to a system for training a descriptor, more specifically to a method and a system for training a descriptor by an active-sampling and a system for detecting objects using an active-sampling trained neural network.

BACKGROUND OF THE INVENTION

Sample selection is important for the final performance of the feature matching in a computer vision system. A descriptor is a neural network that generates feature vectors from images, and can be referred to as a feature descriptor or a feature generator. The difficulty of training a descriptor is increased when hard samples are selected.

The selection of these hard samples are based on a conventional model in hand (e.g. i.e. image pairs that have high loss values are selected as hard samples). However, this approach has drawbacks since the learned model in the early epochs of training is highly dependent on the initialization and the samples in the initial batches.

Accordingly, a training method of a descriptor for feature learning is challenging since it heavily depends on the selected matching/nonmatching image pairs and the initialization, and an active learning procedure of the conventional approach increases the difficulty of batch training over time. As a result, it is difficult to reduce the central processing unit (CPU or processor) usage or power consumption.

Thus, there is a need to provide a novel training method and system for efficiently training descriptors to improve the training efficiency and detection accuracy.

SUMMARY OF THE INVENTION

Some embodiments are based on recognition that a system for active-training a neural network includes an input interface to receive a set of images; a memory to store computer-executable programs including an active sampler, a feature generator and a subset of the images selected from the set of the images, the subset of the images having similarity values based on a predetermined feature domain information; at least one processor, in connection with the memory, to train the feature generator by use of the active sampler, wherein the active sampler causes the at least one processor to perform instructions. The instructions include first-selecting, from the subset of the images, a pair of images as matching pair images according to a threshold of similarity values; second-selecting a pair of images from another subset of the images in the set of the images as unmatched pair images; feeding the matching pair images and the unmatched pair images to the feature generator; updating weighting parameters of the feature generator by solving an optimization problem to minimize a loss function; and increasing the threshold according to preset values, and repeating the first-selecting, the second-selecting, the feeding, the updating and the increasing until all of the subset of the images are fed; and an output interface to render the weighting parameters of the feature generator.

In some cases, the feature generator may be referred to as a feature detector that is a neural network (algorithm module) that outputs locations (i.e. pixel coordinates) of significant areas in images, including a number describing the size or scale of the feature. The features can be used in matching image patches.

According to some embodiments, an active training procedure (method) for descriptor learning is based on the use of isometry in sample domain, e.g. viewpoint difference in the case of patch-based image matching. In addition to checking whether given two samples match or not, we also consider how similar they are if they are matching pairs. Our method provides more robust feature representation and a faster convergence in training. Further, the active training method is similar to a kid learning pattern matching starting from easier primitive shapes. The training starts batch training by feeding samples with low viewpoint difference that are easily detected as matching or non-matching. Gradually we increase a threshold of the viewpoint difference between patterns presented, while expecting to see a better separation.

Rather than using the current learned model to decide on the difficulty of samples, we bring in domain knowledge about the sample pairs. This enables a system of the present invention to better capture feature representations, since it does not rely on a trained model and initialization of model parameters (weighting parameters).

According to embodiments of the present invention, an image processing system can include a system for active-training a neural network including an interface to receive images, wherein the interface is connected with an imaging device and a network is outside the system; a memory to store computer-executable programs including local descriptors and a feature generator trained by a system that includes an input interface to receive a set of images; a memory to store computer-executable programs including an active sampler, a feature generator and a subset of the images selected from the set of the images, the subset of the images having similarity values based on a predetermined feature domain information; at least one processor, in connection with the memory, to train the feature generator by use of the active sampler, wherein the active sampler causes the at least one processor to perform instructions that comprise first-selecting, from the subset of the images, a pair of images as matching pair images according to a threshold of similarity values; second-selecting a pair of images from another subset of the images in the set of the images as unmatched pair images; feeding the matching pair images and the unmatched pair images to the feature generator; updating weighting parameters (model parameters) of the feature generator by solving an optimization problem to minimize a loss function; and increasing the threshold according to preset values, and repeating the first-selecting, the second-selecting, the feeding, the updating and the increasing until all of the subset of the images are fed; and an output interface to render the weighting parameters of the feature generator, and the at least one processor, in connection with the memory, to match images using the trained feature generator according to instructions of the computer-executable programs.

Further, according to embodiments of the present invention, a system (active-training system) for active-training a neural network can reduce central processing unit (CPU or processor) usage, power consumption and/or network bandwidths usages. This can provide the improvement of the functions of the processor (CPU).

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3 is an algorithm describing the details of an active sampling policy, according to embodiments of the present invention;

Figure 1:
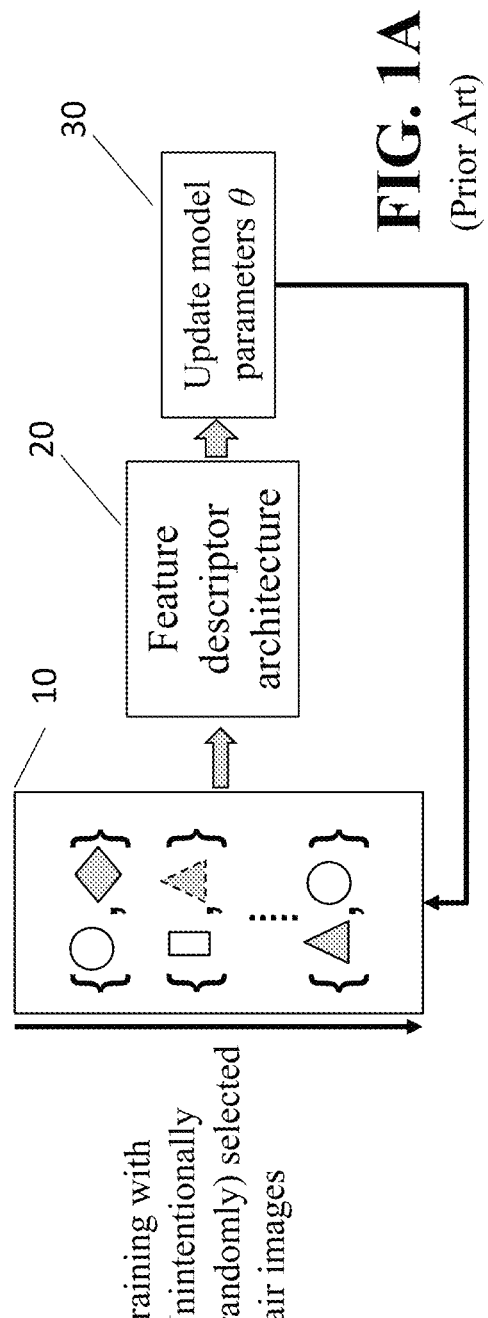
FIG. 1A is a diagram illustrating a training process of a feature generator according to a prior art.
FIG. 1B is a diagram illustrating a training process of a feature generator according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

It would be noted that a computer system may be referred to as a system. Further, the model parameters may be referred to as weighting parameters.

Overview

Recognizing a similar set of images for a given image can improve the performance of object detections or recognition, which can be applied to a computer vision or a robot having an automatic object detection system.

A feature descriptor (feature generator) is a neural network that generates feature vectors from images, which can be applied to an object detection system of a robot that can find a "movable" object, compute the graspable poses of the object based on a similarity of the object. In the present disclosure, a feature descriptor may be referred to as a descriptor, a feature generator, or a neural network.

To improve the performance and accuracy of object detections of the object detection system, the feature descriptor needs to be trained well and effectively by selecting training image pair samples. As the performance of the feature descriptor heavily depends on the selected matching/nonmatching pairs (pair images) and the initialization, we introduce an active learning procedure, in which the difficulty of batch training is gradually increased over time of training.

FIG. 1A is a diagram illustrating a training process of a feature descriptor 20 (or feature descriptor architecture 20) according to a prior art. When training the feature descriptor 20 based on a prior art method, pair image patches (random pair images) are unintentionally (randomly) selected in step 10 using a sampling module (not shown) from an image database and fed to the feature descriptor 20 to train the descriptor 20. While training, model parameters of the feature descriptor 20 are updated in process 30 and newly selected random pair images in the process 10 are fed to the feature descriptor 20 for further training. These training steps are iteratively performed until a predetermined number of the pair image patches are fed to the feature descriptor 20.

Accordingly, it is found that the feature descriptor 20 trained by such random sample selection provides poor feature representations, and in order to improve the performance of feature representations, a heavy amount of the image pairs are required to train the feature generator 20 and a heavy computation load is required, which requires large power consumption of a computer (processor(s)).

On the other hand, some embodiments are based on recognition that a method for training a feature descriptor using the active sampling module 204 is effective to reduce training errors and FPRs (False Positive Rates). This can provide advantages, which the power consumptions of a computer or processor(s) in training of a feature generator system can be sufficiently reduced.

FIG. 1B is a diagram illustrating a training process of a feature descriptor (architecture) 25 according to embodiments of the present invention. A novel training process of the feature descriptor 25 is similar to a kid learning pattern matching. The training process of the feature descriptor 25 is based on an active sampling method, which starts by selecting easier primitive sample pair images 15 from an image database or a set of database images (not shown) using an active sampling module 204 (FIG. 2) and provides them to the feature descriptor 25. The training process progresses based on batch training, in which feeding pair images to the feature descriptor 25 starts obtaining from the sample pair images 15 having higher similarities (similarity values) to the other pair images having less similarities while gradually increasing the difference of similarity value between the pair images 15. In some cases, the similarity value can be defined by a distance metric d of the Euclidean distance between feature vectors obtained from the pair images.

While training the feature descriptor 25, model parameters θ of the feature descriptor 25 are updated in step 35 and newly selected pair images using the active sampler 204 in step 15 are fed to the feature descriptor 25 for further training. These training steps are continuously performed until a predetermined number of pair image patches are fed to the feature descriptor 25 and an update of the model parameters θ is completed, the update is continued to finish feeding the all pair image patches.

In some cases, statistical and nearest neighbor-based outlier rejection methods may be used during training to further increase the performance of active sampling. Further, geometric information such as depth of the patch can be applied.

Figure 2:
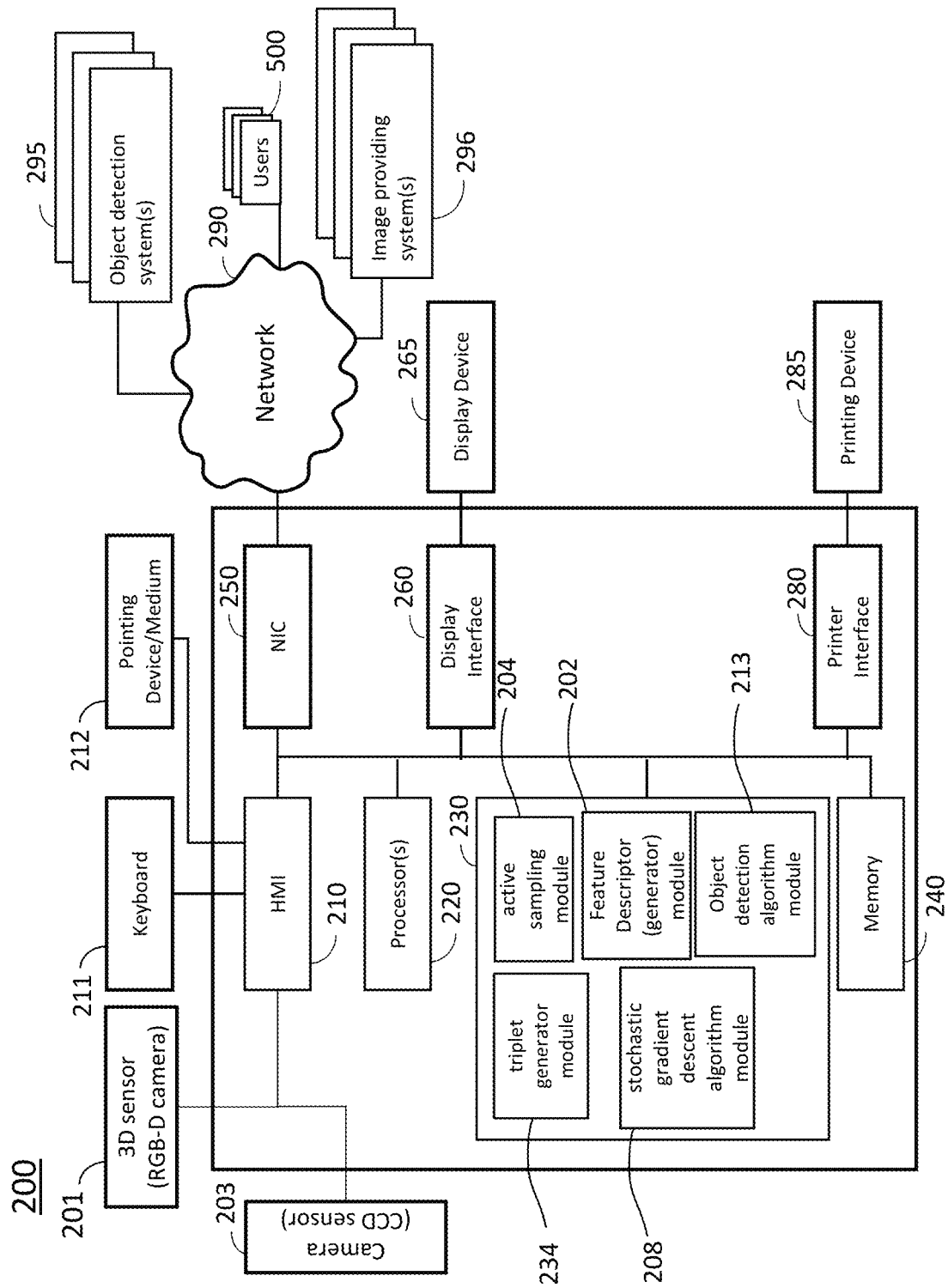
FIG. 2 is a block diagram of a system for training a neural network and for detecting objects using the trained neural network, according to embodiments of the present invention.

FIG. 2 is an example illustrating a block diagram of an object detection system 200 according to some embodiments of the present invention. The object detection system 200 also includes a for training descriptor by an active-sampling. The system 200 includes a human machine interface (HMI) 210 connected with a keyboard 111 and a pointing device/medium 212, a processor 220, a storage device 230, a memory 240, a network interface controller 250 (NIC) connected with a network 290 including local area networks and internet network, a display interface 260 connected with a display device 265, a printer interface 280 connected with a printing device 285. The system 200 can receive image datasets to be trained from an image providing system(s) 296 via the network 290 connected to the NIC 250 for training the feature descriptor 25 of the feature descriptor module 202. The storage device 230 may include an active sampling module 204, and a feature descriptor module 202, a triplet generator module 234, a stochastic gradient descent algorithm module 208, and an object detection algorithm module 213. The feature descriptor module 202 includes the feature descriptor 25 which is a neural network that generates feature vectors from images, and may be referred to as a feature generator module 202. The triplet generator module 234 can be referred to as a triplet generator 234.

The pointing device/medium 212 may include modules that read programs stored on a computer readable recording medium. The storage 230 may include training image sets (not shown) or store the training image sets received from the image providing system 296 via the network 290 and the NIC 250. The object detection system 200 includes a three dimensional (3D) sensor 201 to obtain images (picture images) of object(s) and depth images of the object(s). The object detection system 200 may further include a camera or charge coupled device 203 to obtain an image (or images).

The model parameters θ of the feature descriptor 25 are updated while or after the training process in FIG. 1B. The object detection system 200 can be used as an object detection system based on the trained feature descriptor 25 by receiving an image including object(s) via the network 290 or taking images by the camera 203 using the object detection algorithm module 213 in the storage 230.

In some cases, the trained feature descriptor 25 may be provided to other object detection system(s) 295 via the newt work 290 or a computer-readable recording media storing the trained feature descriptor module 202 including the feature descriptor 25.

For detecting an object in an image, instructions may be provided to the object detection system 200 using the keyboard 211, the pointing device/medium 212 or via the network 290 connected to other computers (not shown in the figure). The object detection system 200 receives the instructions using the HMI 210 and executes the instructions for detecting an object in an image using the processor 220 and an object detection algorithm module 213 stored in the storage device 230. The processor 220 may be a plurality of processors including one or more than graphics processing units (GPUs).

The stochastic gradient descent algorithm module 208 is operable to perform image processing to obtain predetermined formatted image from given images relevant to the instructions. The object detection algorithm module 213 can be used by the object detection system 200 for detecting objects. An object detection process using the object detection system 200 is described below.

In some embodiments, the object detection system 200 may be used to train a feature descriptor module 202 based on the active sampling process described in FIG. 1B, so that the object detection system 200 can perform detections of objects in images, which are stored in the system 200 or provided via the network 290 from the image providing system 296, uses 500 or the camera 203. Furthermore, the feature descriptor 202 having been trained by the above process may be provided to the other object detection systems 295 via the network 290 so that the other object detection systems 295 can effectively improve the accuracies (performances) of object detection system(s) and can sufficiently save the computation powers and the power consumption of the other object detection system(s) 295.

Further, embodiments of the present invention are directed to providing an active training system and method for feature learning. It will be described below how to achieve better local minimum with an active sample batch selection procedure by decreasing the similarity of matching samples, hence increasing difficulty of the training over time. Instead of relying on the trained model in hand for selecting difficult samples, we make use of the domain knowledge to quantify the similarity of matching samples. We build a deep descriptor map that finds an embedding in a lower dimensional Euclidean space, where clusters are separable. We evaluate the performance of our model by using a publicly available dataset to compare with the literature.

According to embodiments of the present disclosure, a method for training a descriptor based on an active training procedure is described below. We propose a curriculum for the training session and increase difficulty of the training over time. We increase difficulty by picking batches during training. We first describe regarding the problem formulation and notation.

Some embodiments of the present invention can be realized by a system for active-training a neural network. The system may include an input interface to receive a set of images, a memory to store computer-executable programs including an active sampler, a feature generator and a subset of the images selected from the set of the images, the subset of the images having similarity values based on a predetermined feature domain information. Further, the system includes at least one processor, in connection with the memory, to train the feature generator by use of the active sampler. In this case, the active sampler stored in the memory or storage causes the at least one processor to perform instructions. The instructions include first-selecting, from the subset of the images, a pair of images as matching pair images according to a threshold of similarity values, second-selecting a pair of images from another subset of the images in the set of the images as unmatched pair images, feeding the matching pair images and the unmatched pair images to the feature generator, updating weighting parameters (model parameters) of the feature generator by solving an optimization problem to minimize a loss function, and increasing the threshold according to preset values, and repeating the first-selecting, the second-selecting, the feeding, the updating and the increasing until all of the subset of the images are fed. Further the system includes an output interface to render the weighting parameters of the feature generator.

In some cases, for training the feature descriptor module, the predetermined feature domain information may indicate viewpoint angles of the images. Further, the loss function is based on a Euclidean distance between features generated for matching pair images and unmatched pair images. Further, the memory comprises a triplet generator (module) 234 that is configured to cause the processor to provide triplets as a combination of matching pair and unmatched pair images, wherein the triplets consist of anchors, positives and negatives.

Anchors are region boxes (i.e. subsets of the input image) proposed by a Region Proposal Network to have high probability of containing an object. In other words, the Region Proposal Network returns the probability of an image box, called anchor, to be background or foreground. The anchors are assigned a binary class label (i.e. can be positive or negative).

For intersection-over-union, when an anchor overlaps with the ground-truth box for more than a predefined threshold, the anchor is labeled "positive".

Conversely, if an anchor's intersection-over-union overlap with the ground truth box less than a threshold, it is assigned the "negative" class label.

According to embodiments of the present invention, a subset of images having similarity values based on a predetermined feature domain information may be preliminary prepared and stored in the storage 230.

In some cases, the similarity values can be defined by rotational distances between camera viewpoint angles of the image pairs. In some cases, the loss function may be a triplet loss function, and the updating weighting parameters may be performed by a stochastic gradient descent algorithm.

Notations

Given a set of clusters $\{D_1, D_2, \ldots, D_k\} = D$, with corresponding distributions $p^{D_i}$, in feature learning the aim is to learn a mapping $f$ that has a range where each cluster is separable in the range space. Let $f_\theta: R^{N \times N} \to R^M$ be the mapping from image domain to the feature domain parameterized by $\theta$ with $N^2 \gg M$ and d be a distance metric in range. In some cases, $\theta$ may be referred to as a model parameter.

Feature map tries to achieve the following:

$$d(f_\theta(a), f_\theta(p)) < d(f_\theta(a), f_\theta(n))$$

$$\forall i, j \neq i \text{ and } \forall a, p \sim p^{D_i}, n \sim p^{D_j} \quad (1)$$

We follow a, p, n notations for 'anchor', 'pair', 'non-pair' respectively, which is a conventional naming in the field. In many applications cluster information is not accessible or number of clusters is arbitrarily large, e.g. patch matching, thus maximum likelihood over the indicator defined in (1) is not possible. Hence, the problem is approximately solved with pairwise loss or triplet loss efficiently where only match or non-match information is used. In this disclosure, we focus on the triplet loss, which enforces that the distance between non-matching samples should be at least a margin m larger than the distance between matching pairs. The loss function L is defined as, $$L_m(a, p, n, f_\theta) = d(f_\theta(a), f_\theta(n)) - d(f_\theta(a), f_\theta(n)) + m \quad (2)$$

In some cases, the loss function L may be referred to as a loss function. Conventionally, a distance metric d is selected as the Euclidean distance to have a Euclidean similarity space. In embodiments according to the present invention, a similarity value can be defined by the distance metric d of the Euclidean distance. Deep feature maps are learned back-propagating the triplet loss through the network. The parameters are optimized with the following optimization:

$$\hat{\theta} = \underset{\theta}{\arg\min} \sum_T L_m(a, p, n, f_\theta) \quad (3)$$

Here $T = \{(a, p, n) | \forall a, p \in D_i, n \in D_j, j \neq i\}$ denotes set of sampled triplets. Triplets are usually pre-generated by a triplet generator module 234 of the system 200 before training and fed through the network as batches to stochastically solve (3), thus the local minimum is biased to the batches at step i of epoch e as $T_e^i \subset T$. In general, the triplet generator module 234 may be a pre-trained neural network.

Additionally, based on m, training triplets that satisfy the constraint may yield to incorrect gradient estimate and hence increase training time and may yield bad local minimum.

Active Sampling (Active Batch Sampling)

Going from easy to hard during training can be satisfied by feeding triplets with decreasing similarity between matching samples (pair images). For a particular dataset D with k clusters, a number of triplets is approximately $$\binom{k}{2} |D_i| \binom{|D_i|}{2}$$

where $D_i$ is taken as average number of samples in a cluster. Hence, determining all triplets might slow down training.

Therefore, we propose a stochastic approximate of sample selection for practical reasons. For a fixed batch size b we apply a threshold on viewpoint difference of triplets from T and randomly pick a subset of b samples of our interest. Such selection might vary due to the interest and in order to have a curriculum with increasing difficulty we propose a selection method based on matching sample similarity.

First few epochs of the deep learning are biased to the random initialization of the network parameters. Therefore, first few epochs form the baseline of the similarity range by putting samples onto space. In order to have descriptive cluster centers, we propose to use samples that are easy to be separated and hence we pick samples with high similarity between matching samples. For feature matching problem, this similarity is considered as the viewpoint similarity. Thus, we call two matching patch pairs as similar if their viewpoint difference is small. Let v(a, p) denote the viewpoint difference between the patches a and p. In some cases, the view point difference between the patches a and p or between a and n may be referred to as a similarity value.

Let us denote the subset of triplets with $\tilde{T}_e^i = \{a,p,n) | v(a,p) \leq \delta_e, \forall (a,p,n) \in T_e^i\}$, where $\delta_e$ indicates the threshold for viewpoint difference at epoch e. The batch for training is formed by randomly picking from $\tilde{T}_e^i$ $$\hat{T}_e^i = \{(a,p,n) \in \tilde{T}_e^i\} \text{ s.t. } |\hat{T}_e^i| b \quad (4)$$

We start from a small threshold (e for viewpoint variation at the first epoch. As training moves forward it is expected that the cluster centers are well structured. Thus we increase the threshold gradually yielding the selection of matching pairs that has higher viewpoint difference.

FIG. 3 shows the details of an active sampling policy as Algorithm 1. The algorithm 1 describes the details of an active sampling policy, according to embodiments of the present invention. This algorithm can be stored in the storage 230 or memory 240 as an active sampling module 204. The active sampling module 204 may be referred to as an active sampling program. The algorithm 1 of FIG. 3 indicates the steps of active sampling during batch training given initial viewpoint variation threshold $\delta_0$. The algorithm 1 actively selects the by increasing a threshold $\delta_0$ at every epoch e.

The algorithm 1 of the active sampling policy may be referred to as an active sampling module stored in the storage 230 or memory 240 as an active sampling module. In this case, the active sampling module 204 performs the steps of the active sampling policy during batch training given initial viewpoint variation threshold $\delta_0$. The algorithm of the active sampler actively selects the pair of images by increasing the threshold at every epoch. Given initial viewpoint variation threshold $\delta_0$, the algorithm generates batches by sampling (Line 4). Lines 5 and 6 receive the batch and update the model parameters respectively. After every epoch, we increase the threshold for viewpoint variation as seen in Line 7.

Architecture

Figure 4:
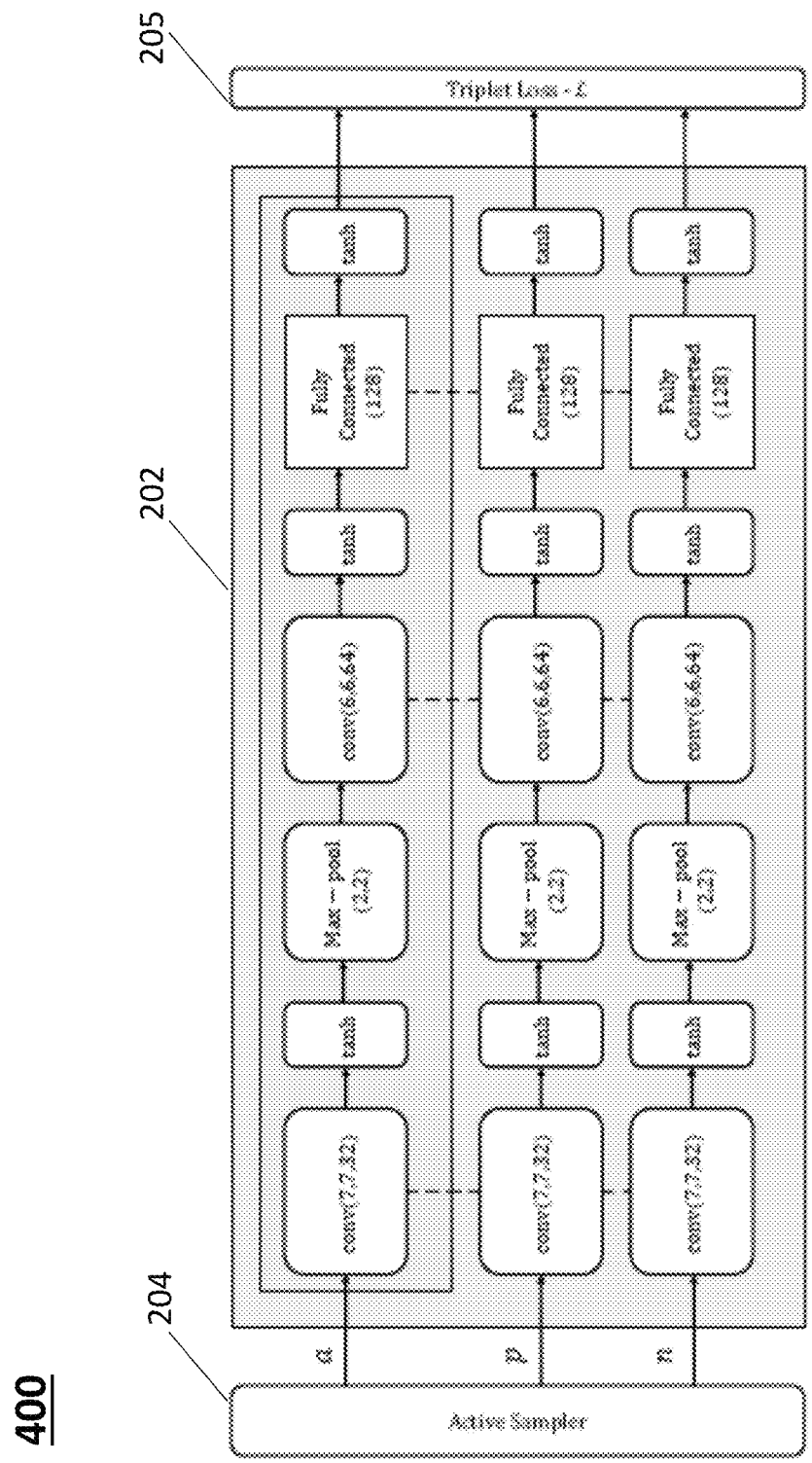
FIG. 4 is a diagram illustrating a neural network, according to embodiments of the present invention.

In order to better evaluate the advantages of the active learning method according to embodiments of the present invention, we use a feature descriptor learning architecture 400 as shown in FIG. 4. The feature descriptor architecture 400 can be operated with the active sampler 204 (active sampling module 204), the feature descriptor module 202 and a triplet loss function module 205 that is stored in the storage 230 or the memory 240 of the system 200. As non-limiting example, the feature generator module 202 includes Conv(7,7)-Tanh-MaxPool(2,2)-Conv(6,6)-Tanh-Fully Connected(128).

The active sampler 204 provides a, p, n as anchors (anchor images), positives (positive images) and negatives (negative images) respectively for training. As denoted with dashed lines, convolutional and fully connected layers share parameters. During inference (for training) only one of the Siamese networks is used.

The training is implemented in Tensorflow. During training we use a stochastic gradient descent algorithm included in the stochastic gradient descent algorithm module 208 stored in the storage 230 with momentum with a fixed learning rate of 10-4 and a momentum of 0.9. We use a difference in rotational degrees of the pair images as the difference between viewpoints. Initial viewpoint difference threshold is taken as $\delta_0 = 10$ degrees. It is increased to the values 30, 60 and 90 at every 5 epochs.

Some experimental results obtained according to the training method of a descriptor and the system discussed above will be provided below as examples. The performance of feature matching is evaluated by following an active learning procedure. We carry out experiments on the image patch benchmark of 1DSfM dataset in order to demonstrate the performance of our technique in a local descriptor matching problem. 1DSfM dataset contains several frames along with their 6DOF poses and corresponding feature points between frames. Therefore, viewpoint difference between two corresponding feature points is provided by the dataset.

Patch-Based Image Matching

We evaluate the performance of the model in a local descriptor learning, where the aim is to determine whether two provided patches are different images of the same point in the world. Performance in patch pair similarity is conventionally reported using receiver operation characteristics (ROC) curve. ROC curve is formed using pairs, where matches have label 1 and non-matches have label 0. We report false positive rate (FPR) at 0.95 recall (true positive rate). Hence this measure tells us how likely a model puts matching pairs together and nonmatching pairs apart.

Figure 5A:
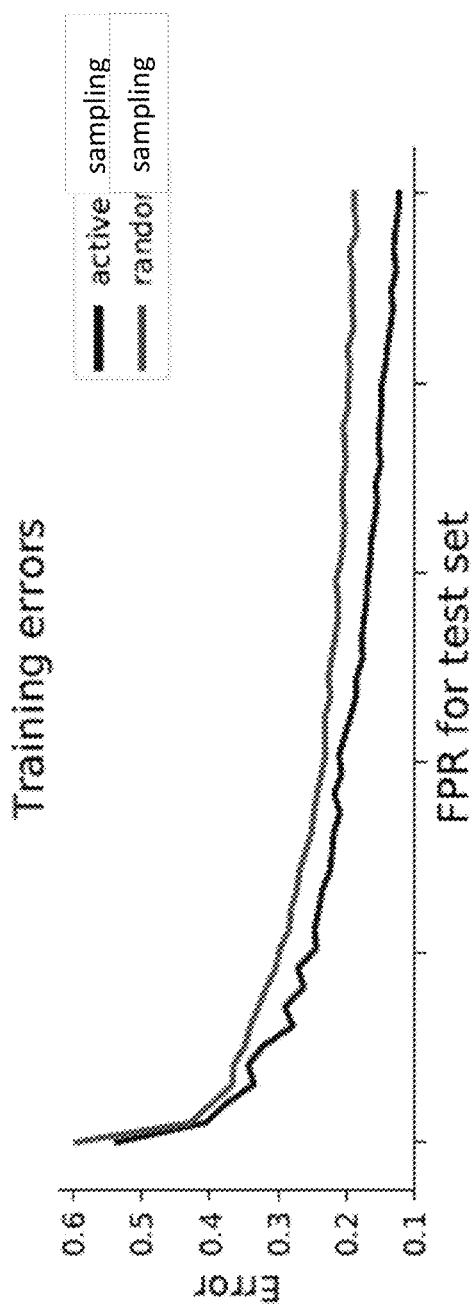
FIG. 5A is a diagram indicating training errors for identical test sets using a random-sampling based neural network and an active sampling based neural network, according to embodiments of the present invention.
Figure 5B:
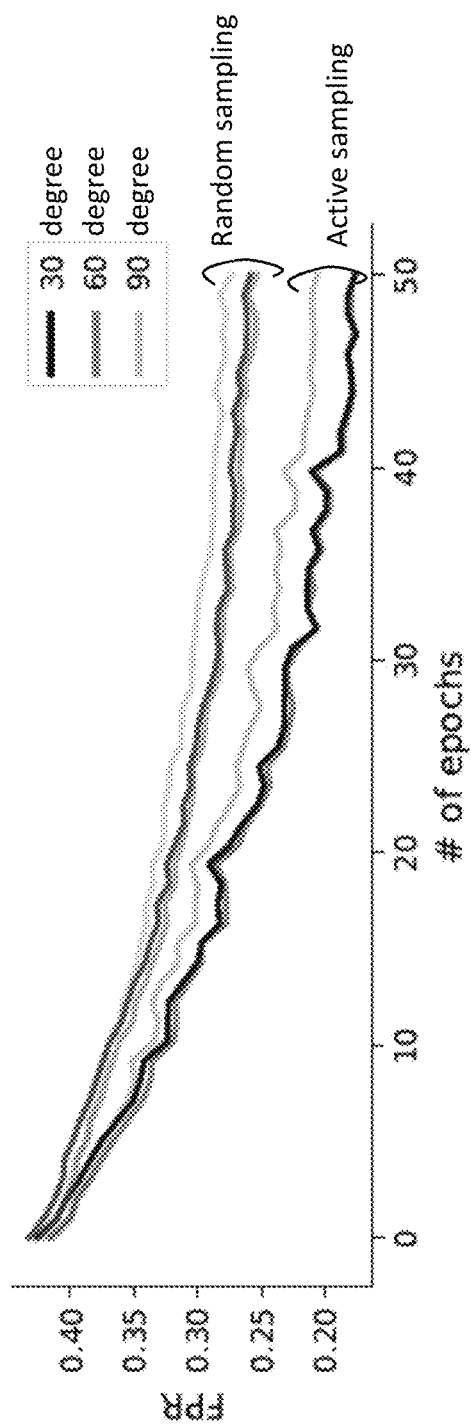
FIG. 5B is a diagram indicating false positive rates (FPRs) plots of three viewpoints as a function of a number of epochs, obtained by using a random-sampling based neural network and an active sampling based neural network, according to embodiments of the present invention.

In experiments we use the 1DSfM dataset, which contains correspondence among frames along with the frame poses. We compare our method with another deep learned feature. Through the experiments we refer to a reference model as 'conventional'. In order to compare the proposed method with previous work, we use the same predefined pairs and generate our triplets randomly based on the provided information. For evaluating the gradual performance increase with active learning, we use the same training data size and learning rate with the conventional method. FIG. 5A shows training errors, and FIG. 5B shows FPR plots. The figure indicates loss values during training and false positive rates (FPRs) at 95% recall using triplet loss as the objective function: (FIG. 5A) training error at each epoch for proposed active sampling and conventional (random sampling) method and (FIG. 5B) FPR per epoch on the test set on sample pairs with at most 30, 60 and 90-degree viewpoint difference.

Top graph shows the training error per epoch for both conventional and proposed training policies, while the bottom plot shows the error on the test set. As can be seen, compared to the conventional method proposed active sampling method decreases the training error faster. Moreover, the FPR on test dataset is significantly smaller using our method. The bottom plot shows the error on sample pairs that have at most 30, 60 and 90-degree viewpoint variation. Our method gives lower error values for pairs with closer viewpoint as expected, while conventional method cannot distinguish between low and high viewpoint variation. This is a useful property of our method, which makes it more convenient in scenes where camera is smoothly moving such as simultaneous localization and mapping (SLAM).

Advantages

Our method actively increases the difficulty of training by picking harder samples over time during batch training. We demonstrated the use of our algorithm on the problem of feature matching. The experiments were carried out on 1DSfM dataset. The presented technique outperforms conventional methods in matching performance while speeding up the training significantly.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A system for active-training a neural network, comprising:
   an input interface to receive a set of images;
   a memory to store computer-executable programs including an active sampler, a feature generator and a subset of the images selected from the set of the images, the subset of the images having similarity values based on a predetermined feature domain information;
   at least one processor, in connection with the memory, to train the feature generator by use of the active sampler, wherein the active sampler is configured to cause the at least one processor to perform instructions that comprise:
      first-selecting, from the subset of the images, a pair of images as matching pair images according to a threshold of similarity values;
      second-selecting a pair of images from another subset of the images in the set of the images as unmatched pair images;
      feeding the matching pair images and the unmatched pair images to the feature generator;
      updating weighting parameters of the feature generator by solving an optimization problem to minimize a loss function; and
      increasing the threshold according to preset values, and repeating the first-selecting, the second-selecting, the feeding, the updating and the increasing until all of the subset of the images are fed; and
   an output interface to render the weighting parameters of the feature generator.

2. The system of claim 1, wherein the predetermined feature domain information indicates viewpoint angles of the images.

3. The system of claim 1, wherein the loss function is based on a Euclidean distance between features generated for matching pair images and unmatched pair images.

4. The system of claim 1, wherein the memory comprises a triplet generator configured to cause the processor to provide triplets as a combination of matching pair and unmatched pair images, wherein the triplets consist of anchors, positives and negatives.

5. The system of claim 1, wherein the similarity values are defined by rotational distances between camera viewpoint angles of the image pairs.

6. The system of claim 1, wherein the loss function is a triplet loss function.

7. The system of claim 1, wherein the updating weighting parameters is performed by a stochastic gradient descent algorithm.

8. An image processing system comprising:
   an interface to receive images, wherein the interface is connected with an imaging device and a network is outside the system;
   a memory to store computer-executable programs including local descriptors and a feature generator trained by a system of claim 1; and
   a processor, in connection with the memory, to match images using the trained feature generator according to instructions of the computer-executable programs.

9. The system of claim 8, wherein the feature generator extracts local descriptors from the images received via the network interface.

10. The system of claim 9, wherein the local descriptors are configured to detect correspondences between two images received via the network interface.

11. The system of claim 8, wherein image matching is decided based on a Euclidean distance between the extracted features of the images.

12. The system of claim 8, wherein a predetermined feature domain information indicates viewpoint angles of the images.

13. The system of claim 8, wherein the memory comprises a triplet generator configured to cause the processor to provide triplets as a combination of matching pair and unmatched pair images, wherein the triplets consist of anchors, positives and negatives.

14. The system of claim 8, wherein the loss function is a triplet loss function.

15. The system of claim 8, wherein a step of updating weighting parameters is performed by a stochastic gradient descent algorithm.

* * * * *